No. 646,268. Patented Mar. 27, 1900.
V. DREWSEN.
APPARATUS FOR MAKING BISULFITE OF LIME.
(Application filed June 15, 1899.)
(No Model.)
2 Sheets—Sheet 1.
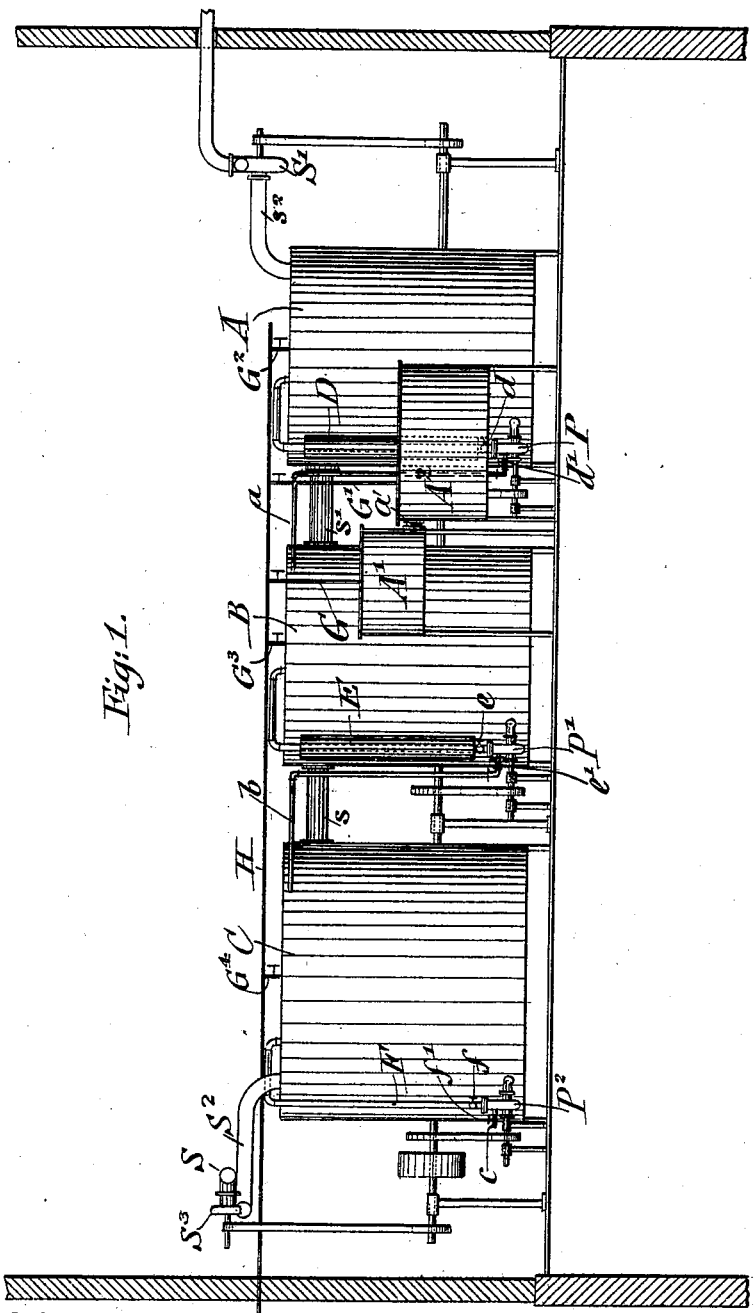

No. 646,268. Patented Mar. 27, 1900.
V. DREWSEN.
APPARATUS FOR MAKING BISULFITE OF LIME.
(Application filed June 15, 1899.)
(No Model.) 2 Sheets—Sheet 2.
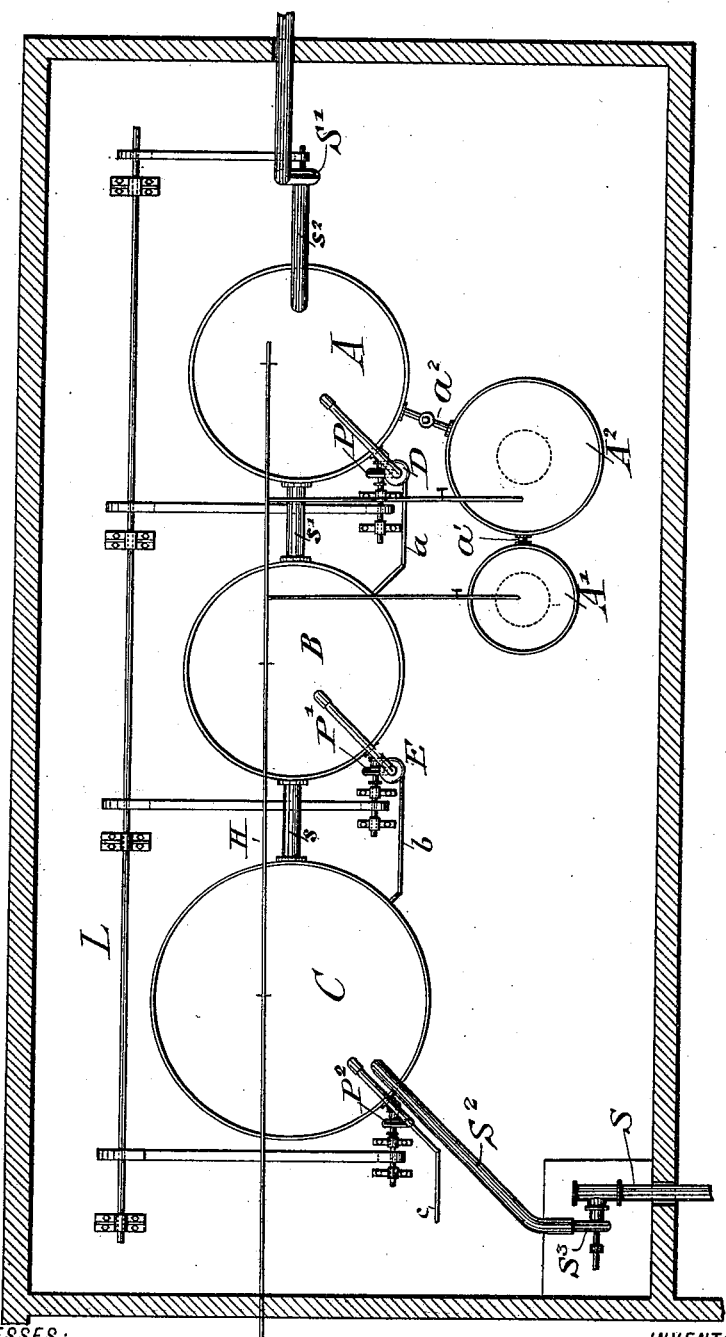
WITNESSES:
INVENTOR
Viggo Drewsen
BY
ATTORNEYS.

UNITED STATES PATENT OFFICE.

VIGGO DREWSEN, OF NEW YORK, N. Y.

APPARATUS FOR MAKING BISULFITE OF LIME.

SPECIFICATION forming part of Letters Patent No. 646,268, dated March 27, 1900.

Application filed June 15, 1899. Serial No. 720,687. (No model.)

*To all whom it may concern:*

Be it known that I, VIGGO DREWSEN, a citizen of the United States, residing in the city of New York, in the borough of Richmond and State of New York, have invented certain new and useful Improvements in Apparatus for Making Bisulfite of Lime, of which the following is a specification.

In the production of bisulfite of lime in sulfite-pulp mills considerable difficulty has arisen heretofore in the summer season which was mainly due, as I have discovered, to the chemical heat generated in the formation of the monosulfite of lime. I have devised various forms of apparatus for neutralizing the chemical heat that is generated during the formation of the monosulfite, one of these being shown and described in Letters Patent of the United States granted to me January 3, 1899, No. 617,237, and have thereby enabled sulfite-pulp mills to carry on the process of producing bisulfite of lime even during the hottest part of the summer without practical difficulties. In my apparatus before referred to I have employed two tanks, one for uniting the milk of lime with the sulfurous-acid gas and forming thereby monosulfite of lime, and the second tank being a storage-tank for the monosulfite. I have since discovered that it is preferable to carry out the process by means of three tanks: first, a tank for cooling the milk of lime by neutralizing the chemical heat developed when the lime is slaked; second, a tank in which the monosulfite is produced, the cooling being continued in this tank, and a third tank in which the cooled monosulfite is changed into bisulfite. In connection with the first tank I use several smaller tanks in which the burnt lime is first slaked, then mixed with an additional quantity of water, and finally conducted into the larger tank. In this tank the milk of lime is cooled, so as to remove the chemical heat produced by the slaking of the lime, and cooling means are provided in connection with the second tank for removing the chemical heat produced during the transformation of the lime into the monosulfite of lime; and the invention consists of an apparatus for producing bisulfite of lime, which comprises a milk-of-lime tank, means for supplying milk of lime thereto, a cooler connected with the milk-of-lime tank, a circulating-pump connected with the cooler and tank, a monosulfite-tank, a pipe connecting said pump with the monosulfite-tank, a cooler connected with the monosulfite-tank, a circulating-pump connected with the monosulfite cooler and tank, a bisulfite-tank, a pipe connecting the monosulfite-pump with the bisulfite-tank, and pipes for supplying successively sulfurous-acid gas to the upper parts of the bisulfite, monosulfite, and milk-of-lime tanks.

In the accompanying drawings, Figure 1 represents a side elevation of my improved form of apparatus for producing bisulfite of lime, and Fig. 2 is a plan view of Fig. 1.

Similar letters of reference indicate corresponding parts.

In my improved apparatus for producing bisulfite of lime three main tanks A, B, and C are employed, the tanks A and B being of the same size, preferably, but smaller than the tank C. The tank A serves for receiving and cooling the milk of lime, the tank B for bringing the charge of milk of lime into contact with sulfurous acid, so as to produce monosulfite of lime, and the tank C for changing the monosulfite into bisulfite of lime. Alongside of the tank A are arranged two auxiliary tanks, a smaller one A' for bringing the burnt lime first in contact with water, so as to slake the lime. During the slaking the mass is agitated in a suitable manner and then transferred by means of the valved pipe $a'$ into a second larger tank $A^2$, in which it is mixed with a still larger quantity of water by continuous agitation, so that milk of lime of the proper degree of concentration is formed. Chemical heat is generated during the slaking of the quicklime in the tanks A' and $A^2$, so that the mass becomes heated. From the tank $A^2$ the milk of lime in heated condition is transferred by means of the valved pipe $a^2$ into the tank A. The heated milk of lime is cooled by arranging a cooler D, of any suitable construction, either cylindrical or coil-shaped, at one side of the tank A, a circulating-pump P being arranged below the cooler, said pump serving to draw the milk of lime from the tank A, forcing it through the cooler in upward direction, and returning it, after passing it through the cooler, into the upper part of the tank, as shown in the drawings. During this operation the valve $d'$ in the pipe $a$, leading from the circulating-pump P to the tank B, is closed. The continuous circulation of the milk of lime, which is thus kept up in the primary tank A and in the cooler D, removes the chemical heat and imparts such temperature to the milk of lime that the absorption of sulfurous-acid gas can readily take place. When the milk of lime is cooled to the required low temperature, it is then pumped through the pipe $a$ over into the tank B by means of the circulating-pump P, the cooler being cut out by the valve $d$. In the tank B it is brought into contact with sulfurous-acid gas, so as to form monosulfite of lime. The chemical heat developed by the absorption during the formation of the monosulfite is neutralized by arranging in the same manner as with tank A a cooler E for the tank B and below the same a second pump P' for keeping up the continuous circulation of the monosulfite solution in the tank B and cooler E. When the monosulfite has been formed and cooled to the required temperature, the valve $e'$ is opened and valve $e$ closed and the monosulfite solution pumped by the pump P' through the pipe $b$ into the tank C, in which it absorbs an additional quantity of sulfurous-acid gas, so as to form a solution or liquor of bisulfite of lime. This solution is kept in motion in the tank C by a third circulating-pump $P^2$, which is arranged near the bottom of the tank C and which keeps the solution in the tank in continuous circulation through the same and the pipe F, so as to bring the solution continuously into contact with a quantity of fresh sulfurous-acid gas until bisulfite-of-lime liquor of the required strength is obtained. No cooler is required for the tank C, as no chemical heat is generated during the formation of the bisulfite of lime. By closing the valve $f$ and opening the valve $f'$ the bisulfite may be pumped from the tank C through the pipe $c$ for use.

The sulfurous-acid gases are supplied from the sulfur-burners by a supply-pipe S, a blower $S^3$, and a pipe $S^2$, and then conducted from the upper part of the closed tank C to the upper part of the tank B by a pipe $s$, and from the upper part of the tank B by a pipe $s'$ to the tank A, and from the top of the latter by means of a pipe $s^2$ and suction-fan S' into the atmosphere. The supply of sulfurous-acid gas is kept up in such proportion that the entire quantity of gas is absorbed in the tanks C and B. Should there be any unabsorbed gases, they are conducted into the upper part of the milk-of-lime tank A and absorbed in the same, so that a partial absorption of sulfurous-acid gas may take place in the milk-of-lime tank and none passes off to the atmosphere. Motion is imparted to the different circulating-pumps, fans, &c., by a line of shafting L, that runs alongside the tanks and by means of belt and pulley transmissions between said shaft and the pumps and fans referred to, as shown clearly in the drawings. Valved pipes G G' $G^2$ $G^3$ $G^4$, connected, respectively, with the tanks A', $A^2$, A, B, and C, are connected at their opposite ends with a supply-pipe H, which is connected with a suitable water-supply, (not shown,) so that required quantity of water may be supplied to each tank at each stage of the process.

The process of making bisulfite of lime is carried out in the apparatus described by first preparing the milk of lime in the auxiliary smaller tanks A' and $A^2$ and then transferring the hot milk of lime into the first tank A and removing the chemical heat from the milk of lime in this tank by the cooler arranged alongside of the same. The charge is then transferred into the next tank B, in which by the absorption of sulfurous-acid gas monosulfite of lime is formed, the chemical heat being again removed by the cooler arranged alongside of this tank, through which the solution is continuously conducted. The charge of monosulfite is then transferred from the tank B to the larger tank C, in which, by addition of water and the absorption of an additional quantity of sulfurous-acid gas, the bisulfite of lime is formed. As the charge of milk of lime is transferred from the front tank into the next adjacent one, the tank A is supplied with the charge which has been prepared in the meantime in the preceding tank $A^2$, and so on, so that the required quantity of bisulfite of lime proportioned to the requirements of the sulfite-pulp mill is produced. The proper low temperature of the liquor in the different tanks is maintained and the transfer is made at regular intervals of times, so that the process can be carried on without difficulty and with comparatively little watching of the solution in the tanks.

Having thus described my invention, I claim as new and desire to secure by Letters Patent—

The apparatus herein described for producing bisulfite of lime, consisting of a milk-of-lime tank, means for supplying milk of lime thereto, a cooler connected with said milk-of-lime tank, a circulating-pump connected with the cooler and tank, a monosulfite-tank, a pipe connecting said pump with the monosulfite-tank, a cooler connected with the monosulfite-tank, a circulating-pump connected with the monosulfite cooler and tank, a bisulfite-tank, a pipe connecting the monosulfite-pump with the bisulfite-tank, and pipes for supplying successively sulfurous-acid gas to the upper parts of the bisulfite, monosulfite and milk-of-lime tanks, substantially as set forth.

In testimony that I claim the foregoing as my invention I have signed my name in presence of two subscribing witnesses.

VIGGO DREWSEN.

Witnesses:
PAUL GOEPEL,
M. H. WURTZEL.